United States Patent
Konaka et al.

(10) Patent No.: US 6,829,137 B2
(45) Date of Patent: Dec. 7, 2004

(54) DIELECTRIC CERAMIC AND MONOLITHIC CERAMIC CAPACITOR INCLUDING SAME

(75) Inventors: Hiroyasu Konaka, Kusatsu (JP); Shozo Kobayashi, Nishinomiya (JP); Harunobu Sano, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 10/736,664

(22) Filed: Dec. 17, 2003

(65) Prior Publication Data

US 2004/0169967 A1 Sep. 2, 2004

(30) Foreign Application Priority Data

Jan. 8, 2003 (JP) ........................................ 2003-002157

(51) Int. Cl.[7] .............................. H01G 4/06; C04B 35/48; C04B 35/46
(52) U.S. Cl. ............................. 361/321.4; 361/321.5; 501/138; 501/139
(58) Field of Search ....................... 361/321.1, 321.2, 361/321.3, 321.4, 321.5, 311, 301.4; 501/137–139

(56) References Cited

U.S. PATENT DOCUMENTS 5,818,686 A * 10/1998 Mizuno et al. ............. 361/311
6,411,495 B2 * 6/2002 Wada et al. ............. 361/321.4
6,649,554 B1 * 11/2003 Chang et al. ................. 501/137

FOREIGN PATENT DOCUMENTS

| JP | 05-009066 | 1/1993 |
| JP | 05-009067 | 1/1993 |
| JP | 05-009068 | 1/1993 |
| JP | 06-005460 | 1/1994 |
| JP | 09-241075 | 9/1997 |
| JP | 09-270366 | 10/1997 |

* cited by examiner

*Primary Examiner*—Eric Thomas
(74) *Attorney, Agent, or Firm*—Dickstein, Shapiro, Morin & Oshinsky, LLP.

(57) ABSTRACT

A dielectric ceramic includes a principal component which contains Ba, Ca and Ti and which has a perovskite structure represented by the general formula $ABO_3$; additive components containing, for example, La and Mn; and a sintering aid, wherein crystal grains of the dielectric ceramic contain Ca, and the intergranular variation in the average Ca concentration within each grain is about 5% or more, in terms of CV value, or the ratio of the number of crystal grains in which the intragranular variation in the Ca concentration is about 5% or more, in terms of CV value, to the total number of crystal grains containing Ca is about 10% or more. A monolithic ceramic capacitor fabricated using the dielectric ceramic is also disclosed.

20 Claims, 1 Drawing Sheet

DIELECTRIC CERAMIC AND MONOLITHIC CERAMIC CAPACITOR INCLUDING SAME

BACKGROUND OF THE INVENTION

1. Field of the Invention

The present invention relates to dielectric ceramics and monolithic ceramic capacitors fabricated using the dielectric ceramics. More particularly, the invention relates to an improvement in a monolithic ceramic capacitor in which the thickness of the dielectric ceramic layers can be advantageously decreased.

2. Description of the Related Art

A conventional monolithic ceramic capacitor is generally fabricated by a method described below.

First, ceramic green sheets containing a raw dielectric ceramic powder are prepared, in which the surface of each ceramic green sheet is coated with a conductive material for forming an internal electrode with a predetermined pattern. As the dielectric ceramic, for example, a material containing $BaTiO_3$ or the like having a perovskite structure as a principal constituent is used.

Next, a plurality of ceramic green sheets including the ceramic green sheets coated with the conductive material are laminated and subjected to thermal compression. An integrated green laminate is thereby formed.

The green laminate is then fired and a sintered laminate is produced. The internal electrodes composed of the conductive material are disposed in the sintered laminate.

External electrodes are formed on the external surfaces of the laminate so as to be electrically connected to specific internal electrodes. The external electrodes are formed, for example, by applying a conductive paste containing a conductive metal powder and a glass frit onto the external surfaces of the laminate, followed by baking.

A monolithic ceramic capacitor is thereby completed.

As the conductive material for the internal electrodes, a relatively inexpensive base metal, such as nickel or copper, has recently often been used in order to reduce the fabrication cost of monolithic ceramic capacitors. However, when a monolithic ceramic capacitor including internal electrodes composed of the base metal is fabricated, firing must be performed in a neutral or reducing atmosphere in order to prevent the base metal from being oxidized. Therefore, the dielectric ceramic used in the monolithic ceramic capacitor must be nonreducing.

As a nonreducing dielectric ceramic, for example, Japanese Unexamined Patent Application Publications No. 5-9066 (patent document 1), No. 5-9067 (patent document 2) and No. 5-9068 (patent document 3) disclose $BaTiO_3$-rare earth oxide-$Co_2O_3$-based compositions.

Japanese Unexamined Patent Application Publications No. 6-5460 (patent document 4) and No. 9-270366 (patent document 5) disclose dielectric ceramics which have high dielectric constants, low rates of change in dielectric constant with temperature and long lifetime at high-temperature loads.

With the recent development in electronics, electronic components used therein are rapidly becoming miniaturized. Accordingly, monolithic ceramic capacitors are also becoming miniaturized and the capacitance thereof is increasing.

Temperature stability of capacitance is also required for monolithic ceramic capacitors. In particular, since the temperature is expected to exceed 130° C. in applications for vehicles, etc., the monolithic ceramic capacitors must satisfy the X8R characteristic stipulated in the EIA standard (i.e., the rate of change in capacitance in the temperature range from −55° C. to 150° C. being within ±15%).

Although the dielectric ceramics disclosed in patent documents 1 to 5 satisfy the X7R characteristic stipulated in the EIA standard (i.e., the rate of change in capacitance in the temperature range from −55° C. to 125° C. being within ±15%), they do not always satisfy the X8R characteristic stipulated in the EIA standard.

When the thickness of the dielectric layers is decreased so as to meet the requirements of miniaturization and increased capacitance of monolithic ceramic capacitors, the intensity of the electric field applied to each dielectric ceramic layer is increased if the rated voltage is the same as that before the decrease in thickness. Consequently, the insulation resistance at room temperature or high temperatures is decreased, resulting in a significant decrease in reliability. Therefore, when the thickness of the dielectric ceramic layers is decreased, the rated voltage must be decreased with respect to the conventional dielectric ceramics.

Accordingly, there is a demand for a monolithic ceramic capacitor in which it is not necessary to decrease the rated voltage even if the thickness of the dielectric ceramic layers is decreased, which has high insulation resistance for high-intensity electric fields, and which is reliable.

Usually, a monolithic ceramic capacitor is used in the presence of an applied DC voltage. In such a case, the capacitance of the monolithic ceramic capacitor is known to change in response to the DC voltage. When the thickness of the dielectric ceramic layers is decreased due to the miniaturization and increase in capacitance of the monolithic ceramic capacitor and the intensity of the DC electric field for each dielectric layer is increased as a result, the dependence of capacitance on DC voltage is further increased.

Accordingly, there is a demand for a monolithic ceramic capacitor in which the change in capacitance is small in the presence of an applied DC voltage.

SUMMARY OF THE INVENTION

It is an object of the present invention to provide a dielectric ceramic used for forming the dielectric ceramic layers of a monolithic ceramic capacitor, in which, even if the thickness of the dielectric ceramic layers is decreased, the change in dielectric constant with temperature and the dependence on DC voltage are small and the product of insulation resistance R and capacitance C (i.e., product CR) is high, in which the insulation resistance has a long accelerated life at high temperatures and high voltages, and in which a base metal can be used for the internal electrodes.

It is another object of the present invention to provide a monolithic ceramic capacitor fabricated using the dielectric ceramic.

A dielectric ceramic of the present invention includes a principal component which contains Ba, Ca and Ti and which has a perovskite structure represented by the general formula $ABO_3$; an additive component containing R, wherein R is at least one element selected from the group consisting of La, Ce, Pr, Nd, Sm, Eu, Gd, Th, Dy, Ho, Er, Tm, Yb, Lu and Y; an additive component containing M, wherein M is at least one element selected from the group consisting of Mn, Ni, Co, Fe, Cr, Cu, Mg and V; and a sintering aid.

In such a dielectric ceramic, in one aspect of the present invention, crystal grains of the dielectric ceramic contain Ca, and the intergranular variation in the average Ca concentration within each grain is about 5% or more, in terms of the coefficient of variation (CV value) in order to overcome the technical problems described above.

In another aspect of the present invention, crystal grains of the dielectric ceramic contain Ca, and the ratio of the number of crystal grains in which the intragranular variation in the Ca concentration is about 5% or more, in terms of CV value, to the total number of crystal grains containing Ca is about 10% or more in order to overcome the technical problems described above.

In the dielectric ceramic of the present invention, the Ca content is preferably about 20 moles or less relative to 100 moles of $ABO_3$.

Preferably, the average grain size of the crystal grains is about 1.0 $\mu$m or less.

In another aspect of the present invention, a monolithic ceramic capacitor includes a laminate including a plurality of dielectric ceramic layers and a plurality of internal electrodes which extend along specific interfaces of the plurality of dielectric ceramic layers and which overlap in the lamination direction; and external electrodes disposed on the external surfaces of the laminate so as to be electrically connected to specific internal electrodes, wherein the dielectric ceramic layers are composed of the dielectric ceramic described above.

The present invention is particularly advantageously applied to the monolithic ceramic capacitors in which the internal electrodes and/or the external electrodes contain a base metal.

DESCRIPTION OF THE PREFERRED EMBODIMENTS

Figure 1:
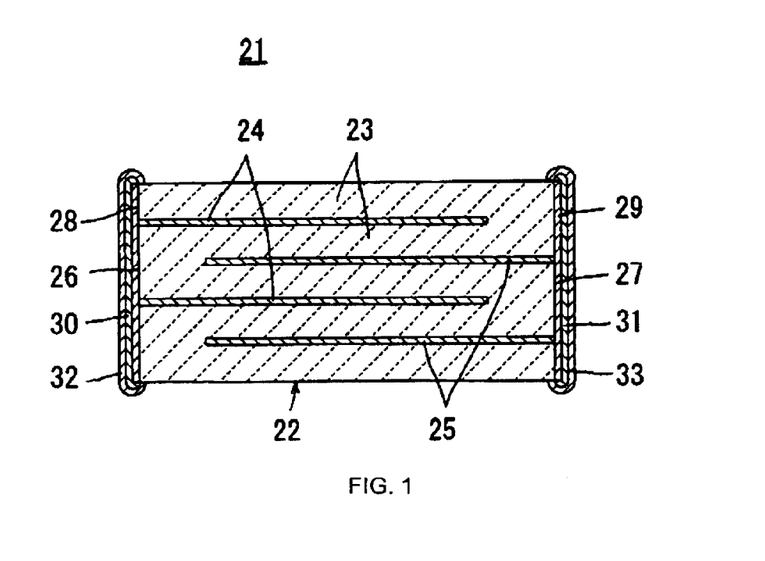
FIG. 1 is a cross-sectional view which schematically shows a monolithic ceramic capacitor in an embodiment of the present invention.

FIG. 1 is a cross-sectional view which schematically shows a monolithic ceramic capacitor 21 in an embodiment of the present invention.

The monolithic ceramic capacitor 21 includes a laminate 22. The laminate 22 includes a plurality of dielectric ceramic layers 23 and a plurality of internal electrodes 24 and 25 which extend along specific interfaces of the plurality of dielectric ceramic layers 23. Both the internal electrodes 24 and 25 extend to the external surfaces of the laminate 22. The internal electrodes 24 which extend to an end face 26 and the internal electrodes which extend to an end face 27 are alternately placed in the laminate 22.

External electrodes 28 and 29 are formed on the external surfaces of the laminate 22 by applying a conductive paste onto the end faces 26 and 27, respectively, followed by baking. As necessary, first plating layers 30 and 31 are formed on the external electrodes 28 and 29, and second plating layers 32 and 33 are further formed thereon, respectively.

In the monolithic ceramic capacitor 21, the plurality of internal electrodes 24 and 25 are formed so as to overlap with each other in the lamination direction. Capacitances are thereby formed between the adjacent internal electrodes 24 and 25. The internal electrodes 24 and the external electrodes 28 are electrically connected to each other, and the internal electrodes 25 and the external electrodes 29 are electrically connected to each other. The capacitances are thereby extracted through the external electrodes 28 and 29.

The dielectric ceramic layers 23 are composed of the following dielectric ceramic of the present invention.

That is, the dielectric ceramic layers 23 are composed of a dielectric ceramic including a principal component which contains Ba, Ca and Ti and which has a perovskite structure represented by the general formula $ABO_3$; an additive component containing R, wherein R is at least one element selected from the group consisting of La, Ce, Pr, Nd, Sm, Eu, Gd, Th, Dy, Ho, Er, Tm, Yb, Lu and Y; an additive component containing M, wherein M is at least one element selected from the group consisting of Mn, Ni, Co, Fe, Cr, Cu, Mg and V; and a sintering aid.

The additives R and M improve the product CR of the dielectric ceramic and the accelerated life of the insulation resistance at high temperatures and high voltages. The amounts of R and M to be added are not particularly limited. In order to extend lifetime at high-temperature loads, the additive content is preferably about 0.1 moles or more relative to 100 moles of $ABO_3$ as the principal component. In order to achieve a high dielectric constant, the additive content is preferably about 10 moles or less relative to 100 moles of $ABO_3$. By combining various types and amounts of R and M to be added, characteristics can be controlled in response to market needs, for example, an increase in dielectric constant, an increase in insulation resistance, and extension of lifetime at high-temperature loads are enabled. The components R and M may be dissolved in $ABO_3$ when characteristics are controlled.

The sintering aid contained in the dielectric ceramic decreases the sintering temperature of the dielectric ceramic and further improves the product CR and the accelerated life of the insulation resistance. For example, a sintering aid containing at least one of $SiO_2$, $Li_2O$ and $B_2O_3$ (boron oxide) as a principal component is advantageously used.

The average grain size of the crystal grains constituting the dielectric ceramic is preferably about 1.0 $\mu$m or less so as to more appropriately meet the requirement for the decreased thickness of the dielectric ceramic layers 23 shown in FIG. 1. When a dielectric ceramic having such an average grain size is used, the thickness of the dielectric ceramic layers 23 can be decreased to about 1 $\mu$m without problems.

Furthermore, the dielectric ceramic has the following characteristics.

That is, crystal grains contain Ca in the dielectric ceramic, and the intergranular variation in the average Ca concentration within each grain is about 5% or more, in terms of CV value.

The intergranular variation in the average Ca concentration within each grain is determined as follows. For example, 10 or more crystal grains are randomly selected, and the Ca concentration is measured at a plurality of analysis points in each crystal grain by energy dispersive X-ray spectroscopy (EDX) using a transmission electron microscope. The average Ca concentration within each grain is calculated from the measurement results. The intergranular variation in the average Ca concentration, i.e., the CV value (%), is calculated based on the equation CV value= (standard deviation/average value)×100.

Since the dielectric ceramic is composed of crystal grains having different average Ca concentrations, it exhibits a stable dielectric constant over a wide temperature range and satisfies the X8R characteristic stipulated in the ELA standard. If the dielectric ceramic is composed of crystal grains which do not contain Ca or crystal grains with the same Ca concentration, it becomes difficult to satisfy the X8R characteristic because the amount of components having Curie points at specific temperatures is increased.

In another aspect of the present invention, the ratio of the number of crystal grains in which the intragranular variation in the Ca concentration is about 5% or more, in terms of CV value, to the total number of crystal grains containing Ca is about 10% or more.

If the ratio of the number of crystal grains in which the intragranular variation in the Ca concentration is about 5% or more, in terms of CV value, is less than about 10%, it becomes difficult to satisfy the X8R characteristic because the amount of components having Curie points at specific temperatures is increased.

The Ca component shifts the Curie temperature to the higher level and stabilizes the change in dielectric constant with time, and also improves the dependence of dielectric constant on DC voltage and the product CR. However, if the Ca content is too high, the accelerated life of insulation resistance at high temperatures and high voltages is shortened. From these viewpoints, the Ca content is preferably about 20 moles or less relative to 100 moles of $ABO_3$.

In addition to the principal component represented by $ABO_3$, the additive components containing R and/or M and the sintering aid may be present in the grain boundaries.

Herein, the "grain boundary" refers to a region between two crystal grains or a region between three or more crystal grains (i.e., a so-called triple point). More specifically, when a clear layer is crystallographically observed in the cross section of the ceramic, the layer corresponds to a grain boundary.

A method for producing the dielectric ceramic or the monolithic ceramic capacitor 21 shown in FIG. 1 will now be described.

First, a raw dielectric ceramic powder constituting the dielectric ceramic layers 23 is prepared preferably by the following process.

That is, predetermined amounts of $BaCO_3$, $CaCO_3$ and $TiO_2$ powders are prepared and mixed, and calcination is perform ed in air to synthesize $ABO_3$. By pulverizing the $ABO_3$, an $ABO_3$ powder is obtained. A plurality of $ABO_3$ powders having different Ca contents are prepared.

To each of the plurality of $ABO_3$ powders, an R-containing compound, an M-containing compound and a sintering aid are added, and as necessary, a Ba-containing compound and/or Ca-containing compound is also added, followed by mixing. The resultant mixed powder is used as the raw dielectric ceramic powder.

By thus preparing the raw dielectric ceramic powder, it is possible to easily produce a dielectric ceramic which satisfies the conditions such as that the intergranular variation in the average Ca concentration within each grain is about 5% or more.

In order to easily produce a dielectric ceramic which satisfies the conditions such as that the ratio of the number of crystal grains in which the intragranular variation in the Ca concentration is about 5% or more is about 10% or more, for example, the following process is employed.

That is, predetermined amounts of $BaCO_3$, $CaCO_3$ and $TiO_2$ powders are prepared and mixed, and calcination is performed in air to synthesize $ABO_3$. By pulverizing $ABO_3$, an $ABO_3$ powder is obtained.

Next, for example, a powder of Ca-containing compound is added into the $ABO_3$ powder, and the resultant mixed powder is calcined in air again to synthesize modified $ABO_3$. By pulverizing the modified $ABO_3$, a modified $ABO_3$ powder is obtained.

To the modified $ABO_3$ powder, an R-containing compound, an M-containing compound and a sintering aid are added, and as necessary, a Ba-containing compound and/or Ca-containing compound is also added, followed by mixing. The resultant mixed powder is used as the raw dielectric ceramic powder.

Additionally, any other method may be employed in order to produce the raw powder for the dielectric ceramic.

Next, an organic binder and a solvent are added to the raw powder for the dielectric ceramic, and mixing is performed to prepare a slurry. Using the slurry, ceramic green sheets constituting the dielectric ceramic layers 23 are molded.

Conductive paste films for constituting the internal electrodes 24 or 25 are formed over specific ceramic green sheets, for example, by screen printing. The conductive paste films contain a base metal, such as nickel, a nickel alloy, copper, or a copper alloy, as the conductive component. The internal electrodes 24 and 25 may be formed, for example, by vapor deposition or plating, instead of by a printing method, such as screen printing.

Next, a plurality of ceramic green sheets provided with the conductive paste films are laminated, and the laminated structure is sandwiched by ceramic green sheets not provided with the conductive paste film. The resultant laminate is press-bonded, and as necessary, cut. A green laminate for the laminate 22 is thereby obtained. The edges of the conductive paste films are exposed to either end face of the green laminate.

The green laminate is fired in a reducing atmosphere. The sintered laminate 22 shown in FIG. 1 is thereby produced. In the laminate 22, the ceramic green sheets constitute the dielectric ceramic layers 23, and the conductive paste films constitute the internal electrodes 24 or 25.

The external electrodes 28 and 29 are then formed on the end faces 26 and 27 so as to be electrically connected to the exposed edges of the internal electrodes 24 and 25, respectively.

The external electrodes 28 and 29 may be composed of the same material as that for the internal electrodes 24 and 25 or may be composed of silver, palladium, a silver-palladium alloy, or the like. It is also possible to add a glass frit composed of $B_2O_3$—$SiO_2$—BaO-based glass, $B_2O_3$—$Li_2O$—$SiO_2$—BaO-based glass or the like, to the powder of such a metal. A proper material is selected in consideration of the applications and locations of use, etc., of the monolithic ceramic capacitor 21.

The external electrodes 28 and 29 are usually formed by applying a paste containing the powder of the conductive metal described above onto the external surfaces of the sintered laminate 22, followed by baking. Alternatively, the paste may be applied onto the external surfaces of the green laminate before firing, and baking may be performed simultaneously with the firing to produce the laminate 22.

The first plating layers 30 and 31 are then formed on the external electrodes 28 and 29 by plating nickel, copper or the like. The second plating layers 32 and 33 are further formed on the first plating layers 30 and 31 by plating solder, tin or the like. Additionally, the plating layers 30 to 33 may be omitted depending on the applications of the monolithic ceramic capacitor 21.

The monolithic ceramic capacitor 21 is thereby completed.

Although there is a possibility that Al, Sr, Zr, Fe, Hf, Na or the like, may be present as an impurity during the formation of the raw dielectric ceramic powder and during any one of the fabrication steps of the monolithic ceramic capacitor 21, a mixture containing such an impurity does not cause any problem in view of electrical characteristics of the monolithic ceramic capacitor 21.

Although there is a possibility that Fe, Co or the like, may be present as an impurity into the internal electrodes 24 and 25 during any one of the fabrication steps of the monolithic ceramic capacitor 21, a mixture containing such an impurity also does not cause any problem in view of electrical characteristics.

The examples of experiments carried out to confirm the advantageous effects of the present invention will be described below.

1. Production of Raw Dielectric Ceramic Powders

The compositions of raw dielectric ceramic powders formed are shown in Tables 1 and 2 below.

In Tables 1 and 2, coefficients in the principal component and additive component indicate molar ratios. The amount of the sintering aid is indicated by parts by weight relative to 100 parts by weight of $ABO_3$ and the Ca content in the raw powder is indicated by mole relative to 100 moles of the principal component ($ABO_3$).

In order to produce the raw powder of the dielectric ceramic in each of Examples 1 to 9 and Comparative Examples 1 to 3, with respect to $ABO_3$ as the principal component, $BaCO_3$, $CaCO_3$ and $SrCO_3$ were prepared as compounds containing A, and $TiO_2$ and $ZrO_2$ were prepared as compounds containing B. A $B_2O_3$—$Li_2O$—$SiO_2$—$BaO$-based sintering aid was also prepared.

EXAMPLE 1

In order to prepare a first $ABO_3$ powder as the principal component $BaCO_3$, $CaCO_3$ and $TiO_2$ powders were weighed so as to satisfy the compositional ratio shown in the "First $ABO_3$" column in Table 1. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the first $ABO_3$ powder was prepared.

In order to prepare a second $ABO_3$ powder as the principal component, $BaCO_3$, $CaCO_3$ and $TiO_2$ powders were weighed so as to satisfy the compositional ratio shown in the "Second $ABO_3$" column in Table 1. The second $ABO_3$ powder was prepared as in the first $ABO_3$ powder.

TABLE 1

| | Principal component | | | | Sintering aid [parts by weight] | Ca content [mole] |
|---|---|---|---|---|---|---|
| | First $ABO_3$ | Second $ABO_3$ | Third $ABO_3$ | Additive component | | |
| Example 1 | $20(Ba_{0.90}Ca_{0.10})TiO_3$ | $40(Ba_{0.85}Ca_{0.15})TiO_3$ | $40(Ba_{0.80}Ca_{0.20})TiO_3$ | $0.5Dy_2O_3/0.3Y_2O_3$ $0.5NiO/0.2MnO_2$ $1.0BaCO_3$ | 1.2 | 16 |
| Example 2 | $50(Ba_{0.83}Ca_{0.15}Sr_{0.02})TiO_3$ | $50(Ba_{0.75}Ca_{0.25})TiO_3$ | — | $1.3Yb_2O_3/0.3Cr_2O_3$ $1.0MgO/1.0BaCO_3$ | 0.8 | 20 |
| Example 3 | $40(Ba_{0.90}Ca_{0.10})TiO_3$ | $60(Ba_{0.85}Ca_{0.15})TiO_3$ | — | $0.8Ho_2O_3/0.3MnO_2$ $1.5MgO/0.5BaCO_3$ | 0.5 | 13 |
| Example 4 | $30(Ba_{0.92}Ca_{0.08})TiO_3$ | $70(Ba_{0.88}Ca_{0.12})TiO_3$ | — | $1.0Y_2O_3/0.2CaCO_3$ $0.5NiO/0.2MnO_2$ $1.0BaCO_3$ | 0.9 | 10.8 |
| Example 5 | | $100(Ba_{0.952}Ca_{0.048})(Ti_{0.99}Zr_{0.01})O_3$ | | $0.6Er_2O_3/0.3Sm_2O_3$ $1.0CaCO_3/0.5MgO$ $0.5BaCO_3$ | 0.5 | 5.8 |
| Example 6 | $30(Ba_{0.99}Ca_{0.01})TiO_3$ | $20(Ba_{0.985}Ca_{0.015})TiO_3$ | $50(Ba_{0.865}Ca_{0.035})TiO_3$ | $0.3Dy_2O_3/0.8MnO_2$ $1.5MgO/1.0BaCO_3$ | 0.7 | 2.1 |

TABLE 2

| | Principal component | | | | Sintering aid [parts by weight] | Ca content [mole] |
|---|---|---|---|---|---|---|
| | First $ABO_3$ | Second $ABO_3$ | Third $ABO_3$ | Additive component | | |
| Example 7 | $80(Ba_{0.96}Ca_{0.04})TiO_3$ | $20(Ba_{0.93}Ca_{0.07})TiO_3$ | — | $1.2Y_2O_3/0.1CaO_3$ $0.5MnO_2/1.0BaCO_3$ | 0.5 | 4.7 |
| Example 8 | $20(Ba_{0.99}Ca_{0.01})TiO_3$ | $20(Ba_{0.92}Ca_{0.05}Sr_{0.02})TiO_3$ | $60(Ba_{0.90}Ca_{0.10})TiO_3$ | $0.8Ho_2O_3/0.2Yb_2O_3$ $0.3MnO_2/0.5MgO$ $0.5BaCO_3$ | 0.9 | 7.2 |
| Example 9 | | $100(Ba_{0.92}Ca_{0.08})TiO_3$ | | $0.8Ho_2O_3/0.2Yb_2O_3$ $1.5CaZrO_3/0.5MgO$ $0.5BaCO_3$ | 0.8 | 9.5 |
| Comparative Example 1 | | $100(Ba_{0.78}Ca_{0.22})TiO_3$ | | $0.5Dy_2O_3/0.3Yb_2O_3$ $0.5NiO/0.2MnO_2$ $1.0BaCO_3$ | 1.2 | 22 |
| Comparative Example 2 | | $100(Ba_{0.942}Ca_{0.058})(Ti_{0.99}Zr_{0.01})O_3$ | | $0.6Er_2O_3/0.3Sm_2O_3$ $0.5MgO/1.5BaCO_3$ | 0.5 | 5.8 |
| Comparative Example 3 | | $100BaTiO_3$ | | $0.8Ho_2O_3/0.2Yb_2O_3$ $0.3MnO_2/0.5MgO$ $0.5BaCO_3$ | 0.9 | 0 |

Furthermore, in order to prepare a third $ABO_3$ powder as the principal component, $BaCO_3$, $CaCO_3$ and $TiO_2$ powders were weighed so as to satisfy the compositional ratio shown in the "Third $ABO_3$" column in Table 1. The third $ABO_3$ powder was prepared as in the first $ABO_3$ powder.

Next, the first, second and third $ABO_3$ powders were mixed at the molar ratios shown in the "First $ABO_3$", "Second $ABO_3$" and "Third $ABO_3$" columns in Table 1. The resultant mixture and additive components at the molar ratios shown in the "Additive component" column were compounded, and a sintering aid in the amount (parts by weight) shown in the "Sintering aid" column in Table 1 was also compounded therewith. A raw dielectric ceramic powder in Example 1 was thereby produced.

EXAMPLE 2

In order to prepare a first $ABO_3$ powder as the principal component, $BaCO_3$, $CaCO_3$, $SrCO_3$ and $TiO_2$ powders were weighed so as to satisfy the compositional ratio shown in the "First $ABO_3$" column in Table 1. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the first $ABO_3$ powder was prepared.

In order to prepare a second $ABO_3$ powder as the principal component, $BaCO_3$, $CaCO_3$ and $TiO_2$ powders were weighed so as to satisfy the compositional ratio shown in the "Second $ABO_3$" column in Table 1. The second $ABO_3$ powder was prepared as in the first $ABO_3$ powder.

Next, the first and second $ABO_3$ powders were mixed at the molar ratios shown in the "First $ABO_3$" and "Second $ABO_3$" columns in Table 1. The resultant mixture and additive components at the molar ratios shown in the "Additive component" column were compounded, and a sintering aid in the amount (parts by weight) shown in the "Sintering aid" column in Table 1 was also compounded therewith. A raw dielectric ceramic powder in Example 2 was thereby produced.

EXAMPLE 3

In order to prepare a first $ABO_3$ powder as the principal component, $BaCO_3$, $CaCO_3$ and $TiO_2$ powders were weighed so as to satisfy the compositional ratio shown in the "First $ABO_3$" column in Table 1. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the first $ABO_3$ powder was prepared.

In order to prepare a second $ABO_3$ powder as the principal component, $BaCO_3$, $CaCO_3$ and $TiO_2$ powders were weighed so as to satisfy the compositional ratio shown in the "Second $ABO_3$" column in Table 1. The second $ABO_3$ powder was prepared as in the first $ABO_3$ powder.

Next, the first and second $ABO_3$ powders were mixed at the molar ratios shown in the "First $ABO_3$" and "Second $ABO_3$" columns in Table 1. The resultant mixture and additive components at the molar ratios shown in the "Additive component" column were compounded, and a sintering aid in the amount (parts by weight) shown in the "Sintering aid" column in Table 1 was also compounded therewith. A raw dielectric ceramic powder in Example 3 was thereby produced.

EXAMPLE 4

In order to prepare a first $ABO_3$ powder as the principal component, $BaCO_3$, $CaCO_3$ and $TiO_2$ powders were weighed so as to satisfy the compositional ratio shown in the "First $ABO_3$" column in Table 1. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the first $ABO_3$ powder was prepared.

In order to prepare a second $ABO_3$ powder as the principal component, $BaCO_3$, $CaCO_3$ and $TiO_2$ powders were weighed so as to satisfy the compositional ratio shown in the "Second $ABO_3$" column in Table 1. The second $ABO_3$ powder was prepared as in the first $ABO_3$ powder.

Next, the first and second $ABO_3$ powders were mixed at the molar ratios shown in the "First $ABO_3$" and "Second $ABO_3$" columns in Table 1. The resultant mixture and additive components at the molar ratios shown in the "Additive component" column were compounded, and a sintering aid in the amount (parts by weight) shown in the "Sintering aid" column in Table 1 was also compounded therewith. A raw dielectric ceramic powder in Example 4 was thereby produced.

EXAMPLE 5

In order to prepare an $ABO_3$ powder as the principal component, $BaCO_3$, $CaCO_3$, $TiO_2$ and $ZrO_2$ powders were weighed so as to satisfy the compositional ratio shown in the "Principal component" column in Table 1. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the $ABO_3$ powder was prepared.

Next, the $ABO_3$ powder was compounded with a $CaCO_3$ powder shown in the "Additive component" column so as to satisfy the compositional ratio shown in Table 1. With the addition of pure water, wet mixing was performed for 24 hours using a ball mill, followed by evaporation drying. The resultant mixed powder was calcined at 900° C. in the natural atmosphere, followed by pulverization, to prepare a modified $ABO_3$ powder.

The modified $ABO_3$ powder was compounded with the additive components other than $CaCO_3$ shown in the "Additive component" column in Table 1 at the molar ratio shown in the column, and a sintering aid in the amount (parts by weight) shown in the "Sintering aid" column in Table 1 was also compounded therewith. A raw dielectric ceramic powder in Example 5 was thereby produced.

EXAMPLE 6

In order to prepare a first $ABO_3$ powder as the principal component, $BaCO_3$, $CaCO_3$ and $TiO_2$ powders were weighed so as to satisfy the compositional ratio shown in the "First $ABO_3$" column in Table 1. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the first $ABO_3$ powder was prepared.

In order to prepare a second $ABO_3$ powder as the principal component, $BaCO_3$, $CaCO_3$ and $TiO_2$ powders were weighed so as to satisfy the compositional ratio shown in the "Second $ABO_3$" column in Table 1. The second $ABO_3$ powder was prepared as in the first $ABO_3$ powder.

Furthermore, in order to prepare a third $ABO_3$ powder as the principal component, $BaCO_3$, $CaCO_3$ and $TiO_2$ powders were weighed so as to satisfy the compositional ratio shown in the "Third $ABO_3$" column in Table 1. The third $ABO_3$ powder was prepared as in the first $ABO_3$ powder.

Next, the first, second and third $ABO_3$ powders were mixed at the molar ratios shown in the "First $ABO_3$", "Second $ABO_3$" and "Third $ABO_3$" columns in Table 1. The resultant mixture and additive components at the molar ratios shown in the "Additive component" column were compounded, and a sintering aid in the amount (parts by weight) shown in the "Sintering aid" column in Table 1 was also compounded therewith. A raw dielectric ceramic powder in Example 6 was thereby produced.

EXAMPLE 7

In order to prepare a first $ABO_3$ powder as the principal component, $BaCO_3$, $CaCO_3$ and $TiO_2$ powders were weighed so as to satisfy the compositional ratio shown in the "First $ABO_3$" column in Table 2. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the first $ABO_3$ powder was prepared.

In order to prepare a second $ABO_3$ powder as the principal component, $BaCO_3$, $CaCO_3$ and $TiO_2$ powders were weighed so as to satisfy the compositional ratio shown in the "Second $ABO_3$" column in Table 2. The second $ABO_3$ powder was prepared as in the first $ABO_3$ powder.

Next, the first and second $ABO_3$ powders were mixed at the molar ratios shown in the "First $ABO_3$" and "Second $ABO_3$" columns in Table 2. The resultant mixture and additive components at the molar ratios shown in the "Additive component" column were compounded, and a sintering aid in the amount (parts by weight) shown in the "Sintering aid" column in Table 2 was also compounded therewith. A raw dielectric ceramic powder in Example 7 was thereby produced.

EXAMPLE 8

In order to prepare a first $ABO_3$ powder as the principal component, $BaCO_3$, $CaCO_3$ and $TiO_2$ powders were weighed so as to satisfy the compositional ratio shown in the "First $ABO_3$" column in Table 2. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the first $ABO_3$ powder was prepared.

In order to prepare a second $ABO_3$ powder as the principal component, $BaCO_3$, $CaCO_3$, $SrCO_3$ and $TiO_2$ powders were weighed so as to satisfy the compositional ratio shown in the "Second $ABO_3$" column in Table 2. The second $ABO_3$ powder was prepared as in the first $ABO_3$ powder.

Furthermore, in order to prepare a third $ABO_3$ powder as the principal component, $BaCO_3$, $CaCO_3$ and $TiO_2$ powders were weighed so as to satisfy the compositional ratio shown in the "Third $ABO_3$" column in Table 2. The third $ABO_3$ powder was prepared as in the first $ABO_3$ powder.

Next, the first, second and third $ABO_3$ powders were mixed at the molar ratios shown in the "First $ABO_3$", "Second $ABO_3$" and "Third $ABO_3$" columns in Table 2. The resultant mixture and additive components at the molar ratios shown in the "Additive component" column were compounded, and a sintering aid in the amount (parts by weight) shown in the "Sintering aid" column in Table 2 was also compounded therewith. A raw dielectric ceramic powder in Example 8 was thereby produced.

EXAMPLE 9

In order to prepare an $ABO_3$ powder as the principal component, $BaCO_3CaCO_3$ and $TiO_2$ powders were weighed so as to satisfy the compositional ratio shown in the "Principal component" column in Table 2. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the $ABO_3$ powder was prepared.

Next, the $ABO_3$ powder was compounded with a $CaZrO_3$ powder shown in the "Additive component" column so as to satisfy the compositional ratio shown in Table 2. With the addition of pure water, wet mixing was performed for 24 hours using a ball mill, followed by evaporation drying. The resultant mixed powder was calcined at 900° C. in air, followed by pulverization, to prepare a modified $ABO_3$ powder.

The modified $ABO_3$ powder was compounded with the additive components other than $CaZrO_3$ shown in the "Additive component" column in Table 2 at the molar ratio shown in the column, and a sintering aid in the amount (parts by weight) shown in the "Sintering aid" column in Table 2 was also compounded therewith. A raw dielectric ceramic powder in Example 9 was thereby produced.

COMPARATIVE EXAMPLE 1

In Comparative Example 1, a raw dielectric ceramic powder having the same composition as that in Example 1 was prepared with a different Ca content and by a different method from those in Example 1.

In order to prepare an $ABO_3$ powder as the principal component $BaCO_3$, $CaCO_3$ and $TiO_2$ powders were weighed so as to satisfy the compositional ratio shown in the "Principal component" column in Table 2. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the $ABO_3$ powder was prepared.

The $ABO_3$ powder and additive components at the molar ratios shown in the "Additive component" column were compounded, and a sintering aid in the amount (parts by weight) shown in "Sintering aid" column in Table 2 was also compounded therewith. A raw dielectric ceramic powder in Comparative Example 1 was thereby produced.

COMPARATIVE EXAMPLE 2

In Comparative Example 2, a raw dielectric ceramic powder having the same composition as that in Example 5 was prepared by a method different from that used in Example 5.

In order to prepare an $ABO_3$ powder as the principal component, $BaCO_3$, $CaCO_3$, $TiO_2$ and $ZrO_2$ powders were weighed so as to satisfy the compositional ratio shown in the "Principal component" column in Table 2. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the $ABO_3$ powder was prepared.

The $ABO_3$ powder and additive components at the molar ratios shown in the "Additive component" column were compounded, and a sintering aid in the amount (parts by weight) shown in "Sintering aid" column in Table 2 was also compounded therewith. A raw dielectric ceramic powder in Comparative Example 2 was thereby produced.

COMPARATIVE EXAMPLE 3

A raw dielectric ceramic powder in Comparative Example 3 was different from the raw dielectric ceramic powders in Examples 1 to 9 and Comparative Examples 1 and 2 in that Ca was not incorporated.

In order to prepare an $ABO_3$ powder as the principal component, $BaCO_3$ and $TiO_2$ powders were weighed so as to satisfy the compositional ratio shown in the "Principal component" column in Table 2. With the addition of pure water, wet mixing was performed for 24 hours using a ball mill, followed by evaporation drying. The resultant mixed powder was calcined at 1,100° C. in air to synthesize $ABO_3$, and by pulverizing this $ABO_3$, the $ABO_3$ powder was prepared.

The $ABO_3$ powder and additive components at the molar ratios shown in the "Additive component" column were compounded, and a sintering aid in the amount (parts by weight) shown in "Sintering aid" column in Table 2 was also compounded therewith. A raw dielectric ceramic powder in Comparative Example 3 was thereby produced.

2. Fabrication of Monolithic Ceramic Capacitor

To the raw dielectric ceramic powder in each of Examples 1 to 9 and Comparative Examples 1 to 3, a polyvinyl butyral-based binder and an organic solvent, such as ethanol, were added, and wet mixing was performed using a ball mill. A ceramic slurry was thereby prepared.

The ceramic slurry was formed into sheets by a doctor blade process so that dielectric ceramic layers after firing had a thickness of 4 μm, and rectangular ceramic green sheets were thereby produced.

Next, conductive paste films were formed by screen printing a conductive paste mainly composed of nickel onto the ceramic green sheets.

A plurality of ceramic green sheets containing the ceramic green sheets provided with the conductive paste films were laminated in such a manner that the conductive paste films were alternately exposed to either end face. A green laminate was thereby prepared.

The green laminate was heated at 350° C. in a nitrogen atmosphere to remove the binder, and then firing was performed for 2 hours at the temperature shown in Table 3 in a reducing atmosphere comprising gases of $H_2$, $N_2$ and $H_2O$ having an oxygen partial pressure of $10^{-9}$ to $10^{-12}$ MPa to obtain a sintered laminate.

A conductive paste containing a $B_2O_3$—$Li_2O$—$SiO_2$—BaO-based glass frit and silver as a conductive component was applied to both end faces of the laminate, and baking was performed at 800° C. in a nitrogen atmosphere. External electrodes which were electrically connected to the internal electrodes were thereby formed.

Each monolithic ceramic capacitor thus fabricated had outer dimensions in which the width was 1.6 mm, the length was 3.2 mm and the thickness was 1.2 mm, and the dielectric ceramic layers disposed between the internal electrodes had a thickness of 4 μm. The total number of effective dielectric ceramic layers was 100, and the area of the counter electrode per layer was 2.1 $mm^2$.

3. Evaluation of Electrical Characteristics

With respect to the monolithic ceramic capacitor thus fabricated in each of Examples 1 to 9 and Comparative Examples 1 to 3, various electrical characteristics were evaluated.

First, the dielectric constant E and the insulation resistance at room temperature were measured for each monolithic ceramic capacitor. The dielectric constant ε was measured at 25° C., 1 kHz and 1 $V_{rms}$. In order to measure the insulation resistance at an electric field of 10 kV/mm, a DC voltage of 40 V was applied for 2 minutes, and the insulation resistance was measured at +25° C. The product of the capacitance (C) and the insulation resistance (R), i.e., the product CR, was obtained.

The rate of change in capacitance with temperature was also measured. With respect to the rate of change in capacitance with temperature, the X8R characteristic stipulated in the EIA standard was evaluated. That is, the rate of change at −55° C. and the rate of change at 150° C. based on the capacitance at 25° C. ($\Delta C/C_{25}$) were measured.

A high-temperature load test was also carried out in which the change in insulation resistance with time was measured for 36 samples for each example by applying a voltage of 60 V at 170° C. so as to produce an electric field of 15 kV/mm. The time at which the insulation resistance reached 200 kΩ or less was defined as the lifetime, and an average lifetime was calculated.

The rate of chance in capacitance (i.e., dielectric constant) in the presence of an applied DC voltage of 3 kV/mm was calculated based on the capacitance in the absence of the applied DC voltage.

Table 3 shows the dielectric constant ε, the product CR, the temperature characteristics ($\Delta C/C_{25}$), the average lifetime and the change in capacitance in the presence of the applied DC voltage.

TABLE 3

|  | Firing Temperature [° C.] | Dielectric constant ε | Product CR [ΩF] | Temperature characteristics ($\Delta C/C_{25}$) [%] | | Average lifetime [hour] | Rate of change in capacitance in the presense of applied DC voltage [%] |
| --- | --- | --- | --- | --- | --- | --- | --- |
|  |  |  |  | −55° C. | 150° C. |  |  |
| Example 1 | 1140 | 1290 | 5820 | −6.1 | −14.6 | 280 | −5.8 |
| Example 2 | 1160 | 1470 | 6940 | −8.0 | −11.3 | 148 | −6.6 |
| Example 3 | 1180 | 1820 | 5620 | −7.7 | −6.8 | 315 | −8.9 |
| Example 4 | 1180 | 1780 | 6130 | −7.3 | −8.2 | 214 | −7.6 |
| Example 5 | 1200 | 2150 | 5200 | −9.1 | −13.3 | 185 | −9.9 |
| Example 6 | 1220 | 2210 | 5390 | −6.9 | −14.5 | 150 | −11.0 |
| Example 7 | 1220 | 1770 | 5510 | −9.0 | −11.7 | 253 | −8.6 |
| Example 8 | 1180 | 1730 | 6450 | −5.4 | −9.1 | 268 | −9.1 |
| Example 9 | 1160 | 1920 | 7120 | −7.5 | −12.0 | 323 | −6.7 |

TABLE 3-continued

|  | Firing Temperature [° C.] | Dielectric constant ε | Product CR [ΩF] | Temperature characteristics ($\Delta C/C_{25}$) [%] -55° C. | 150° C. | Average lifetime [hour] | Rate of change in capacitance in the presense of applied DC voltage [%] |
|---|---|---|---|---|---|---|---|
| Comparative Example 1 | 1160 | 1950 | 1930 | −15.2 | −7.1 | 9 | −14.3 |
| Comparative Example 2 | 1200 | 1780 | 3900 | −7.0 | −19.8 | 180 | −12.7 |
| Comparative Example 3 | 1250 | 2580 | 3060 | −8.8 | −22.7 | 22 | −26.4 |

4. Examination of Microstructure

With respect to the monolithic ceramic capacitors in Examples 1 to 4 and 6 to 8 and Comparative Examples 1 to 3, the microstructures of the dielectric ceramics constituting the dielectric ceramic layers were examined. More specifically, the examination was carried out as follows.

Figure 2:
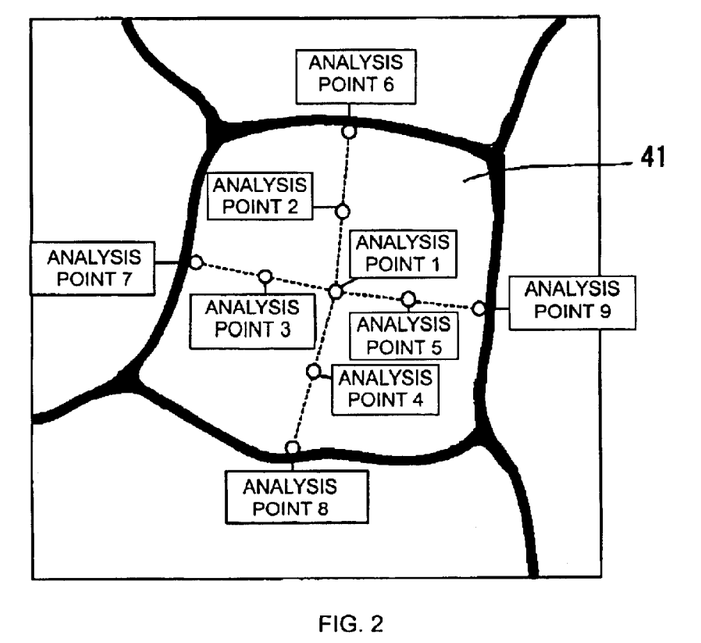
FIG. 2 is an enlarged schematic diagram which shows an example of analysis points used in the analysis of Ca concentration in a crystal grain.

First, the monolithic ceramic capacitor sample was polished in a direction perpendicular to the surfaces along which the internal electrodes extended to expose the dielectric ceramic layers. The crystal grains and the grain boundaries (including triple points) were observed with a transmission electron microscope. In order to analyze the Ca content within crystal grains, at least 10 crystal grains were selected randomly. As shown in FIG. 2, at least 9 analysis points were selected in each of the selected crystal grains 41 including the center point (analysis point 1) and any points (analysis points 6 to 9) located within 5% from the surface of the crystal grain 41 relative to the diameter. As an electron beam for the analysis, a 2 nm probe was used.

For example, the Ca concentrations at the analysis points 1 to 9 were measured by energy dispersive X-ray spectroscopy (EDX) using the transmission electron microscope, and the average value was calculated and defined as the average Ca concentration within the crystal grain. As the intergranular variation in the average Ca concentration, the CV value (%), i.e., (standard deviation/average value)×100, was calculated. The results thereof are shown in the "CV value of average Ca concentration within crystal grain" in Table 4 below.

A broken surface of the monolithic ceramic capacitor sample was subjected to thermal etching, and the etched surface was photographed using a scanning electron microscope. The grain size was obtained from the photograph. At least 10 crystal grains were selected randomly, and the average value of the grain sizes was calculated and defined as the average grain size. The results thereof are also shown in the "Average grain size of crystal grains" column in Table 4.

TABLE 4

|  | CV value of average Ca concentration within crystal grain [%] | Average grain size of crystal grains [μm] |
|---|---|---|
| Example 1 | 23 | 0.05 |
| Example 2 | 37 | 0.18 |
| Example 3 | 15 | 0.54 |
| Example 4 | 12 | 0.76 |
| Example 6 | 5 | 1.00 |
| Example 7 | 9 | 0.38 |
| Example 8 | 11 | 0.43 |

TABLE 4-continued

|  | CV value of average Ca concentration within crystal grain [%] | Average grain size of crystal grains [μm] |
|---|---|---|
| Comparative Example 1 | 4 | 1.30 |
| Comparative Example 3 | 0 | 0.78 |

With respect to the monolithic ceramic capacitors in Examples 5 and 9 and Comparative Example 2, at least 10 crystal grains were selected randomly in the same manner as that described above, and the Ca concentrations at a plurality of analysis points within each crystal grain were obtained. The intragranular variation in the Ca concentration, i.e., the CV value, and the ratio of the number of crystal grains in which the CV value is 5% or more was calculated. The results thereof are shown in the "Ratio of crystal grains with CV value of 5% or more" in Table 5 below.

With respect to Examples 5 and 9 and Comparative Example 2, the average grain size of crystal grains was also obtained in the same manner as that described above. The results thereof are also shown in Table 5.

TABLE 5

|  | Ratio of crystal grains with CV value of 5% or more [%] | Average grain size of crystal grains [μm] |
|---|---|---|
| Example 5 | 10 | 0.95 |
| Example 9 | 43 | 0.65 |
| Comparative Example 2 | 5 | 0.46 |

5. Comprehensive Evaluation

In each of Examples 1 to 4 and 6 to 8, the "CV value of average Ca concentration within crystal grain" is about 5% or more, as shown in Table 4, and it is evident that a plurality of crystal grains which relatively greatly differ in Ca content are present.

In each of Examples 5 and 9, the "ratio of crystal grains with CV value of 5% or more" is about 10% or more, as shown in Table 5.

In each of Examples 1 to 9, the "temperature characteristics" satisfy the X8R characteristic stipulated in the EIA standard, as shown in Table 3, the "product CR" is relatively high, and the "average lifetime" is relatively long, thus showing excellent reliability. The "rate of change in capacitance with DC in the presence of applied DC voltage" is small.

In contrast, the "CV value of average Ca concentration within crystal grain" in Comparative Example 1, as shown in Table 4, is 4%, and it is evident that a plurality of crystal grains which relatively greatly differ in Ca content are not present. Consequently, the "temperature characteristics" do not satisfy the X8R characteristic stipulated in the EIA standard, in Comparative Example 1, as shown in Table 3, the "product CR" is relatively small at 1,930, and the "average lifetime" is short at 9 hours. Therefore, it is not possible to obtain sufficient reliability. In Comparative Example 1, the "Ca content" exceeds about 20 moles, as shown in Table 2, which is also considered as a factor in a decrease in the "average lifetime".

In Comparative Example 2, the "ratio of crystal grain with CV value of 5% or more is only 5%, as shown in Table 5. Consequently, the "temperature characteristics" do not satisfy the X8R characteristic stipulated in the EIA standard, as shown in Table 3.

In Comparative Example 3, the "CV value of average Ca concentration within crystal grain" is 0%, as shown in Table 4, and it is evident that a plurality of crystal grains having different Ca contents are not present. In Comparative Example 3, the "temperature characteristics" do not satisfy the X8R characteristic stipulated in the EIA standard, and the "average lifetime" is short at 22 hours, as shown in Table 3. Therefore, it is not possible to obtain sufficient reliability. The "rate of change in capacitance in the presence of applied DC voltage" is large at −26.4%.

In the dielectric ceramic of the present invention, the intergranular variation in the average Ca concentration within each grain is about 5% or more, in terms of CV value, or the ratio of the number of crystal grains in which the intragranular variation in the Ca concentration is about 5% or more, in terms of CV value, is about 10% or more. Consequently, the change in dielectric constant with temperature and the dependence on DC voltage are small, the product CR is high and the insulation resistance has a long accelerated life at high temperatures and high voltages. Therefore, even if the layers are decreased in thickness, excellent reliability is shown.

By fabricating a monolithic ceramic capacitor using the dielectric ceramic, the monolithic ceramic capacitor can be miniaturized and the capacitance thereof can be increased because the thickness of the dielectric ceramic layers can be decreased. Since the temperature characteristics of capacitance satisfy the X8R characteristic stipulated in the EIA standard, the dielectric ceramic can be advantageously used for monolithic ceramic capacitors in applications for vehicles, etc.

By setting the Ca content at 20 moles or less relative to 100 moles of $ABO_3$ in the dielectric ceramic, while maintaining the effects of the Ca component to shift the Curie temperature to the higher level, to stabilize the change in dielectric constant with time, and to improve the dependence of dielectric constant on DC voltage and the product CR, it is possible to avoid the inconvenience in that the accelerated life of insulation resistance at high temperatures and high voltages being shortened due to the excessive amount of Ca.

By setting the average grain size of the crystal grains constituting the dielectric ceramic of the present invention at about 1.0 µm or less, the dielectric ceramic can more appropriately meet the requirement of decreased thickness of dielectric ceramic layers of dielectric ceramic capacitors.

What is claimed is:

1. A dielectric ceramic comprising:
    a principal component comprising Ba, Ca and Ti and which has a perovskite structure represented by the general formula $ABO_3$;
    a first additive component comprising R, wherein R is at least one element selected from the group consisting of La, Ce, Pr, Nd, Sm, Eu, Gd, Th, Dy, Ho, Er, Tm, Yb, Lu and Y;
    a second additive component comprising M, wherein M is at least one element selected from the group consisting of Mn, Ni, Co, Fe, Cr, Cu, Mg and V; and
    a sintering aid,
    wherein crystal grains of the dielectric ceramic contain Ca, and the intergranular variation in the average Ca concentration within each grain is about 5% or more.

2. A dielectric ceramic according to claim 1, wherein the number of crystal grains in which the intragranular variation in the Ca concentration is about 5% or more to the total number of crystal grains containing Ca is about 10% or more.

3. A dielectric ceramic according to claim 2, wherein the Ca content is about 20 moles or less relative to 100 moles of $ABO_3$.

4. A dielectric ceramic according to claim 3, wherein the average grain size of the crystal grains is about 1.0 µm or less.

5. A monolithic ceramic capacitor comprising:
    a laminate comprising at least three dielectric ceramic layers and at least two internal electrodes which extend along different interfaces between dielectric ceramic layers and which overlap in the lamination direction; and
    a pair of external electrodes disposed on external surfaces of the laminate so as to be electrically connected to different internal electrodes,
    wherein the dielectric ceramic layers comprise a dielectric ceramic according to claim 4.

6. A monolithic ceramic capacitor comprising:
    a laminate comprising at least three dielectric ceramic layers and at least two internal electrodes which extend along different interfaces between dielectric ceramic layers and which overlap in the lamination direction; and
    a pair of external electrodes disposed on external surfaces of the laminate so as to be electrically connected to different internal electrodes,
    wherein the dielectric ceramic layers comprise a dielectric ceramic according to claim 3.

7. A monolithic ceramic capacitor comprising:
    a laminate comprising at least three dielectric ceramic layers and at least two internal electrodes which extend along different interfaces between dielectric ceramic layers and which overlap in the lamination direction; and
    a pair of external electrodes disposed on external surfaces of the laminate so as to be electrically connected to different internal electrodes,
    wherein the dielectric ceramic layers comprise a dielectric ceramic according to claim 2.

8. A dielectric ceramic according to claim 4, wherein the content of first and second additives is about 0.1 to 10 moles relative to 100 moles of $ABO_3$.

9. A monolithic ceramic capacitor comprising:
    a laminate comprising at least three dielectric ceramic layers and at least two internal electrodes which extend along different interfaces between dielectric ceramic layers and which overlap in the lamination direction; and
    a pair of external electrodes disposed on external surfaces of the laminate so as to be electrically connected to different internal electrodes, wherein the dielectric ceramic layers comprise a dielectric ceramic according to claim 8.

10. A dielectric ceramic according to claim 1, wherein the Ca content is about 20 moles or less relative to 100 moles of $ABO_3$.

11. A dielectric ceramic according to claim 10, wherein the average grain size of the crystal grains is about 1.0 $\mu$m or less.

12. A dielectric ceramic according to claim 11, wherein the content of first and second additives is about 0.1 to 10 moles relative to 100 moles of $ABO_3$.

13. A monolithic ceramic capacitor comprising:
- a laminate comprising at least three dielectric ceramic layers and at least two internal electrodes which extend along different interfaces between dielectric ceramic layers and which overlap in the lamination direction; and
- a pair of external electrodes disposed on external surfaces of the laminate so as to be electrically connected to different internal electrodes,
- wherein the dielectric ceramic layers comprise a dielectric ceramic according to claim 11.

14. A monolithic ceramic capacitor comprising:
- a laminate comprising at least three dielectric ceramic layers and at least two internal electrodes which extend along different interfaces between dielectric ceramic layers and which overlap in the lamination direction; and
- a pair of external electrodes disposed on external surfaces of the laminate so as to be electrically connected to different internal electrodes,
- wherein the dielectric ceramic layers comprise a dielectric ceramic according to claim 10.

15. A dielectric ceramic according to claim 1, wherein the average grain size of the crystal grains is about 1.0 $\mu$m or less.

16. A dielectric ceramic according to claim 15, wherein the content of first and second additives is about 0.1 to 10 moles relative to 100 moles of $ABO_3$.

17. A monolithic ceramic capacitor comprising:
- a laminate comprising at least three dielectric ceramic layers and at least two internal electrodes which extend along different interfaces between dielectric ceramic layers and which overlap in the lamination direction; and
- a pair of external electrodes disposed on external surfaces of the laminate so as to be electrically connected to different internal electrodes,
- wherein the dielectric ceramic layers comprise a dielectric ceramic according to claim 15.

18. A dielectric ceramic according to claim 1, wherein the content of first and second additives is about 0.1 to 10 moles relative to 100 moles of $ABO_3$.

19. A monolithic ceramic capacitor comprising:
- a laminate comprising at least three dielectric ceramic layers and at least two internal electrodes which extend along different interfaces between dielectric ceramic layers and which overlap in the lamination direction; and
- a pair of external electrodes disposed on external surfaces of the laminate so as to be electrically connected to different internal electrodes,
- wherein the dielectric ceramic layers comprise a dielectric ceramic according to claim 18.

20. A monolithic ceramic capacitor comprising:
- a laminate comprising at least three dielectric ceramic layers and at least two internal electrodes which extend along different interfaces between dielectric ceramic layers and which overlap in the lamination direction; and
- a pair of external electrodes disposed on external surfaces of the laminate so as to be electrically connected to different internal electrodes,
- wherein the dielectric ceramic layers comprise a dielectric ceramic according to claim 1.

\* \* \* \* \*